United States Patent [19]

Conway

[11] Patent Number: 5,673,095
[45] Date of Patent: Sep. 30, 1997

[54] DUAL RATE SPRING-ACTION EYEWEAR TEMPLE

[75] Inventor: Simon M. Conway, Lima, N.Y.

[73] Assignee: Bausch & Lomb Incorporated, Rochester, N.Y.

[21] Appl. No.: 687,824

[22] Filed: Jul. 26, 1996

[51] Int. Cl.[6] .................................. G02C 5/16; G02C 5/22
[52] U.S. Cl. ............................ 351/113; 351/153; 16/228
[58] Field of Search .................................. 351/111, 113, 351/121, 153; 16/228

[56] References Cited

U.S. PATENT DOCUMENTS

| | | | |
|---|---|---|---|
| 1,572,733 | 2/1926 | McCourt | 351/113 |
| 1,599,843 | 9/1926 | Schumacher | 351/113 |
| 3,531,190 | 9/1970 | Leblanc | 351/113 |
| 3,713,731 | 1/1973 | Gardner | 351/113 |
| 3,923,384 | 12/1975 | Leblanc | 351/113 |
| 4,618,226 | 10/1986 | Sartor | 351/113 |
| 4,995,713 | 2/1991 | Curto | 351/113 |

FOREIGN PATENT DOCUMENTS 1185072  7/1959  France .

OTHER PUBLICATIONS

AHUSSN 08/631769 Entitled "Spring Temple for Eyewear" filed Apr. 11, 1996 by Simon M. Conway.

*Primary Examiner*—Huy Mai
*Attorney, Agent, or Firm*—Katherine McGuire

[57] ABSTRACT

A spring-action temple for eyewear includes an L-shaped notch formed in the outwardly facing surface of the temple, the notch forming a finger portion having a tip portion. As a lateral force is applied to the back end of the temple, the temple flexes at a thinned wall section of the notch for a first distance of travel $T_1$, with the tip portion moving toward the front end of the temple until the tip abuts the wall of the notch. The temple may flex even further outwardly by flexing at a location rearwardly of the notch for a second distance of travel $T_2$. Upon removal of lateral forces, the temple automatically returns to its unbiased position.

7 Claims, 1 Drawing Sheet

DUAL RATE SPRING-ACTION EYEWEAR TEMPLE

BACKGROUND OF THE INVENTION

The present invention relates to eyewear, and more particularly relates to spring-action temples for eyewear.

Spring-action temples for eyewear have been proposed. Examples of such may be seen in the following patents:

U.S. Pat. No. 1,572,733 issued Feb. 9, 1926 to P. H. McCourt

U.S. Pat. No. 1,599,843 issued to E. L. Schumacher on Sep. 14, 1926

U.S. Pat. No. 3,531,190 issued to C. L. LeBlanc on Sep. 29, 1970

U.S. Pat. No. 3,923,384 issued to C. L. LeBlanc on Dec. 2, 1975

U.S. Pat. No. 4,618,226 issued to Sartor et al. on Oct. 21, 1986

U.S. Pat. No. 4,995,713 issued to Curto et al. on Feb. 26, 1991

French Patent No. 1,185,072 to Fedon on Jul. 29, 1959

As may be seen in the foregoing patents, spring-action temples for eyewear typically comprise a separate spring element incorporated into the temple or hinge area of the eyewear, with the spring enabling the temple to elastically pivot or flex a limited degree laterally outwardly beyond its normally open position. The intent is that the temple will flex to fit a variety of head widths while providing a snug fit against the head.

While the above sampling of eyewear temples operate in the general manner of spring-action temples just described, they include many drawbacks. For example, they involve the assembly of a plurality of small parts which require close tolerances for proper assembly, thereby increasing manufacturing costs. Additionally, the prior designs have only a single spring rate, that is, they do not permit flexing of the temple beyond the flexing attributable directly by the spring itself. As such, further application of lateral forces against the temple beyond that afforded by the spring may damage or break the temple. There therefore still exists a need for an improved spring-action temple for eyewear which is durable, reliable, inexpensive to manufacture, and provides a comfortable fit for a variety of head sizes.

SUMMARY OF THE INVENTION

The present invention addresses the above drawbacks of prior spring-action temples by providing a spring-action temple for eyewear which may be formed entirely as one piece. In the preferred embodiment, the spring component is integrated and part of the design of the temple member itself. As such, the spring-action temple of the present invention is extremely economical to manufacture, while also providing a very reliable, durable temple which is also aesthetically pleasing. In an alternate embodiment, the spring may be a separate piece which is attached directly to the temple member. In both embodiments, the spring allows flexing of the temple for a first distance of travel beyond the normally open position of the temple on the eyewear front. Additionally, since the temple member is formed from a flexible material, upon continued application of a lateral force against the temple, the temple may flex a second distance of travel beyond the first distance of travel by flexing at a location rearwardly of the spring. Once all lateral forces are removed, the temple quickly and automatically reverts back to its normally open, unbiased position.

More particularly, in the preferred embodiment, the present invention is comprised of a single piece of plastic or metal alloy which is flexible. For example, the temple could be a molded plastic piece made from nylon. The temple of the invention could also be made from a metal alloy, for example, those having super-elastic or pseudo-elastic properties (e.g., NiTi), Berylium copper, stainless steel and spring steel. The temple is formed elongated with opposite front and back ends, the front end being attached to an eyewear front, and the back end being configured for placement adjacent the ear of the wearer. The spring-action component of the temple is in the form of a generally L-shaped notch. The notch begins as a small slot formed transversely in the outside surface of the temple adjacent the front end thereof, and extends inwardly toward the inside surface of the temple which faces toward the head of the wearer. The notch then extends rearwardly toward the back end of the temple a distance greater than the length of the transversely directed slot, thereby forming an "L" shaped notch in the temple.

The notch forms a finger portion on the temple with the outside surface of the temple, and also creates a thinned wall section at the inner surface of the temple opposite the finger portion. The tip of the finger is spaced a small distance from the front end of the temple when the temple is in a non-stressed, unbiased position. As the temple is forced further laterally outwardly from its normally open position, the temple flexes at the thinned wall section with the tip of the finger portion approaching the front end of the temple. As the temple is forced further laterally outwardly, the finger portion will continue moving toward the front end of the temple until the finger tip firmly abuts the front end of the temple, thereby acting as a positive stop and closing the space between the finger tip and the front end of the temple. This is the first distance of travel the temple may flex beyond its fully open, unbiased position on the eyewear. As the temple is forced even further laterally outwardly, the elastic modulus of the material from which the temple is fabricated will permit the temple to flex a limited distance beyond the first distance of travel which is considered the second distance of travel. Upon removal of the lateral force, the temple will return to its normally open, unbiased position with the tip of the finger portion spaced from the front end of the temple.

In the preferred embodiment of the invention, the finger portion is an integral part of the temple itself, being formed with the temple as it is fabricated. In an alternate embodiment, the finger portion may comprise a separate piece which is subsequently attached to the temple.

DETAILED DESCRIPTION

Figure 3:
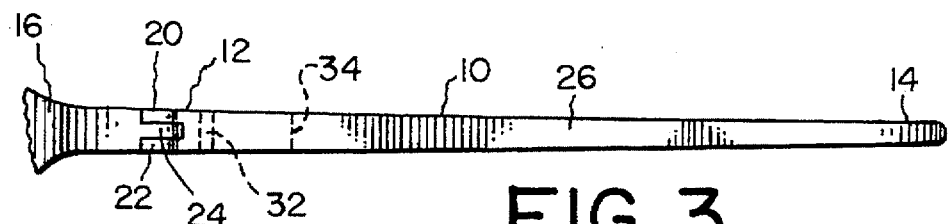
FIG. 3 is a side, elevational view of the inwardly facing side thereof.

Referring now to the drawing, there is seen in the various Figures a temple 10 having opposite front and back ends 12 and 14, respectively, with front end 12 being pivotally connected to an eyewear front 16 via a hinge pin 18 passing through prongs 20 and 22 formed on front 12, and prong 24 formed on front 16 which extends between prongs 20 and 22 (FIG. 3). Other types of pivotal connections between temple 10 and front 12 are possible, and the invention is therefore not limited to the specific connection shown and described herein. For example, rather than being integrally formed with the temple and front as are prongs 20,22 and 24, respectively, a separate metal hinge assembly may be attached to the front end 12 and front 16 of the eyewear.

Temple 10 may be formed from a variety of materials such as plastics and metals, however, the material from which temple 10 is made must exhibit at least a minimum degree of flexibility. An example of a plastic material from which temple 10 may be made is nylon, and examples of metallic alloys from which temple 10 may be made include NiTi, Berylium copper, stainless steel and spring steel.

Figure 4:
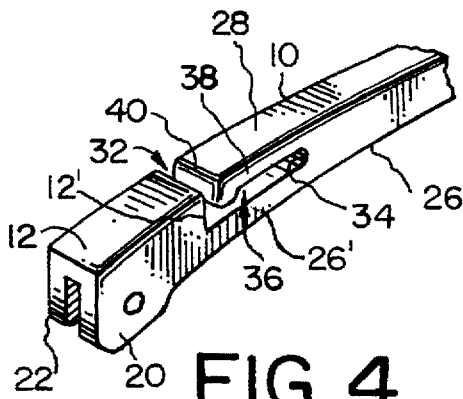
FIG. 4 is a fragmented, perspective view of the front end of the temple in the unbiased position.

Temple 10 includes opposite inner and outer side surfaces 26 and 28 which face toward and away from the head when the eyewear is worn, respectively. Temple 10 is shown in its normally open, unbiased position in solid lines in FIG. 1. The spring-action of the temple is provided in the form of a generally L-shaped notch 30. Notch 30 begins at opening 32 formed in the outer surface 28 of temple 10 adjacent front end 12 thereof as seen best in FIGS. 1, 2 and 4. Opening 32 is first directed inwardly of the temple toward inner surface 26, traversing the entire width W of the temple 10. Opening 32 then extends directly rearwardly toward the back end 14 of temple 10, terminating at wall 34 with this linear portion of notch 30 being labeled 36. The L-shaped notch 30 thus forms with outer wall 28 a finger portion 38 having a tip portion 40. In the normally open, unbiased position of temple 10 seen in FIGS. 1, 2 and 4, tip portion 40 is spaced a small distance S from front end 12 (FIG. 2). Also, in the preferred embodiment shown and described herein, finger portion 38 is formed integrally with temple 10 as temple 10 is formed (e.g., by molding or cutting). Alternatively, finger 38 could be a separate piece which is subsequently attached to temple 10 (e.g., by rivets or cementing).

Figure 1:
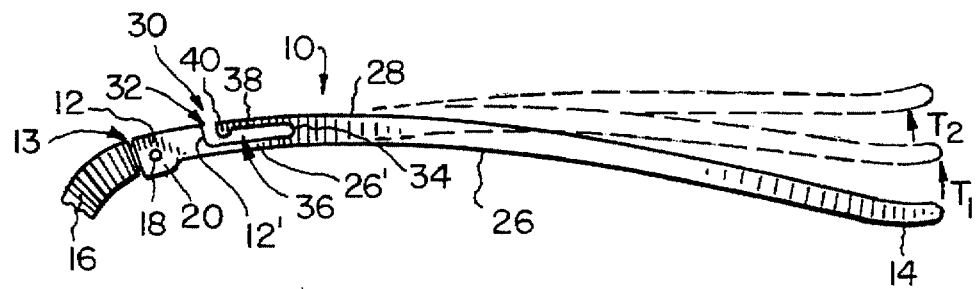
FIG. 1 is a plan view of the temple of the invention attached to a front (fragmented) with the spring positions of the temple shown in phantom lines.
Figure 2:
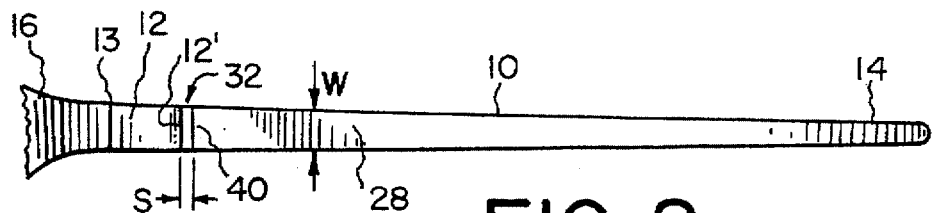
FIG. 2 is a side, elevational view of the outwardly facing side thereof.
Figure 5:
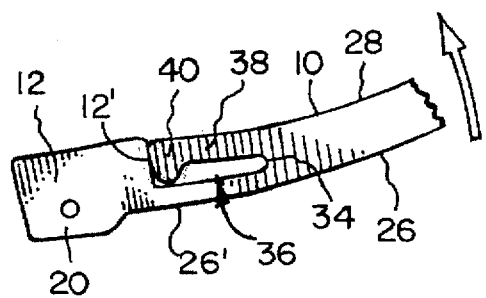
FIG. 5 is a fragmented, side elevational view of the front end of the temple in the flexed position.

Referring to FIG. 1, temple 10 is shown in its normally open, unbiased position in solid lines as noted above. This is defined as the full pivotal extent at hinge assembly 20, 22, 24 and pin 18 due to front end 12 abutting front 16 at point 13. Upon forcing temple 10 further outwardly a first distance $T_1$ in the direction of the arrow in FIG. 1, temple 10 will begin to flex primarily at inner wall portion 26' which is a thinned section of temple 10 and defines one side of notch 30. As this outward force is applied on temple back end 14, finger tip portion 40 moves toward front end 12 until tip portion 40 abuts wall 12' as seen in FIG. 5, thereby temporarily closing space S. This first distance $T_1$ of temple flex as seen in phantom lines in FIG. 1 is the basic spring-action of the temple, allowing temple 10 to yield to a larger head size than that permitted with the normal, unbiased, open position of the temple shown in solid lines. The spring-action temple also is useful when removing the eyewear, and will flex to reduce the "drag-effect" of the temple against the side of the head should the eyewear be removed from the head with excessive force from one side.

It will thus be appreciated that the tip portion 40 of finger 38 forms a stop with wall 12' of front end portion 12 at the full extent of flex travel $T_1$ occurring primarily at thinned wall portion 26'. Upon continued application of a lateral force against temple end 14, while flexing at wall 26' will cease due to tip 40 abutting wall 12', temple 10 will continue to flex at a location rearwardly of notch 30 due to the inherent flexible property of the material from which temple 10 is made. Temple may thus flex a second distance $T_2$, with the total distance of flex being $T_1+T_2$. Upon removal of the lateral load against temple end 14, temple 10 will return to its normally open, unbiased position.

It will thus be appreciated that the present invention provides an effective spring-action temple for eyewear which may flex two distinct distances of lateral travel. Furthermore, it is extremely cost-effective since the spring element may be integrated directly into the temple as the temple is fabricated.

What is claimed is:

1. A spring-action temple for an eyewear front, said temple comprising:

a) an elongated temple member having opposite front and back end portions and opposite inner and outer side surfaces; and b) an L-shaped notch formed in said temple member adjacent said front end thereof, said notch having an opening formed through said outer surface and directed toward said inner side surface for a first portion of said notch, said opening then directed rearwardly toward said back end of said temple for a second portion of said notch, said notch defining a finger portion with said outer side surface of said temple, said finger portion including a tip portion which is spaced from said front end in the unbiased position of said temple, said notch further defining a thinned wall section at said inner side surface of said temple opposite said finger portion.

2. The temple of claim 1 wherein said thinned wall section flexes and said finger tip portion moves toward said front end upon application of a lateral force against said temple back end in the direction of said outer side surface.

3. The temple of claim 2 wherein said finger tip portion abuts said temple front end upon reaching the end of a first distance of travel $T_1$ of temple flexing.

4. The temple of claim 2 wherein said notch extends the entire width of said temple.

5. The temple of claim 3 wherein said temple may flex at a location between said notch and said back end for a second distance of travel $T_2$ upon continued application of a lateral force against said temple back end beyond said first distance of travel $T_1$, wherein the total distance of flex travel of said temple equals $T_1+T_2$.

6. The temple of claim 1 wherein said front end includes means for pivotally attaching said temple to an eyewear front.

7. The temple of claim 1 wherein said first portion of said notch is shorter than said second portion of said notch.

* * * * *